UNITED STATES PATENT OFFICE.

THOMAS J. NEAVITT, OF AUSTIN, TEXAS.

WALL AND CEILING POLISH.

SPECIFICATION forming part of Letters Patent No. 446,265, dated February 10, 1891.

Application filed September 20, 1890. Serial No. 365,687. (No specimens.)

*To all whom it may concern:*

Be it known that I, THOMAS J. NEAVITT, of Austin, in the county of Travis and State of Texas, have invented a certain new and useful Wall and Ceiling Polish, of which the following is a specification.

This invention relates to improvements in wall and ceiling polishes; and it has for its object to provide an improved polish of this character which shall give to the walls and ceilings a more brilliant and lustrous appearance, which will reflect light, and have the appearance of a highly-polished surface, as marble.

My improved compound consists of white spirits of turpentine, one gallon; light-colored picked mastic, sixteen ounces; light-colored sandarac, sixteen ounces; oil of lavender, one ounce; white oil of poppy, one and one-fourth ounce; and powdered glass one and one-fourth pound.

In preparing the polish I take the turpentine, mastic, and sandarac and glass and place them in a suitable vessel, as a glass, or tin can, or jar, or bottle, and tightly cork the same, and then agitate the vessel. When the ingredients have dissolved, I take and strain the same through a suitable strainer—as, for instance, fine muslin—and then add one ounce of oil of lavender and one and one-fourth ounce of white oil of poppy to each liquid quart of the compound. The mixture is then thoroughly agitated and set in the sunlight to bleach, when it will become almost as clear as water and nearly as limpid. It can be applied with an ordinary brush.

The compound is durable, undecaying, and retains its beautiful gloss and brilliancy for a long time. It is water-proof. The turpentine acts as a solvent of the mastic and the sandarac, and the oil of lavender, being volatile, prevents the other ingredients from chilling. The oil of poppy cements the whole together in a firm glossy surface, and serves also as a drier.

It is deemed essential that the turpentine predominate, and that the mastic and sandarac be of equal quantities for the best results. The glass gives to the polish a sparkling and brilliant luster.

What I claim as new is—

The water-proof polish herein described, composed of white spirits of turpentine, light-colored mastic, and light-colored sandarac in equal quantities, oil of lavender, powdered glass, and white oil of poppy, in substantially the proportions set forth.

THOMAS J. NEAVITT.

Witnesses:
GEO. B. LUCAS,
TOM D. SMITH.